(12) United States Patent
Bandy et al.

(10) Patent No.: US 9,033,726 B2
(45) Date of Patent: May 19, 2015

(54) SYSTEMS FOR ESTABLISHING ELECTRICAL INTERCONNECTIONS FOR HELMET-MOUNTED DEVICES

(71) Applicant: EXELIS, INC., McLean, VA (US)

(72) Inventors: Gregory Seth Bandy, Roanoke, VA (US); William Eric Garris, Salem, VA (US)

(73) Assignee: EXELIS, INC., McLean, VA (US)

( * ) Notice: Subject to any disclaimer, the term of this patent is extended or adjusted under 35 U.S.C. 154(b) by 41 days.

(21) Appl. No.: 13/798,739

(22) Filed: Mar. 13, 2013

(65) Prior Publication Data

US 2014/0273544 A1  Sep. 18, 2014

(51) Int. Cl.
*H01R 13/62* (2006.01)
*A42B 3/04* (2006.01)

(52) U.S. Cl.
CPC .......................................... *A42B 3/04* (2013.01)

(58) Field of Classification Search
USPC ...................... 439/372, 37, 347; 362/105, 108
See application file for complete search history.

(56) References Cited

U.S. PATENT DOCUMENTS

| 2,379,493 | A | * | 7/1945 | Morehouse | .............. | 128/201.23 |
| 3,990,757 | A | * | 11/1976 | Gill | ................................. | 439/37 |
| 4,987,608 | A | | 1/1991 | Cobb | | |
| 5,467,479 | A | | 11/1995 | Mattes | | |
| 5,542,627 | A | | 8/1996 | Crenshaw et al. | | |
| 7,726,994 | B1 | | 6/2010 | Willey | | |
| 7,945,967 | B2 | | 5/2011 | Barber et al. | | |
| 8,209,780 | B1 | | 7/2012 | Lemire | | |
| 8,308,489 | B2 | * | 11/2012 | Lee et al. | ......................... | 439/37 |
| 2007/0114252 | A1 | | 5/2007 | Gruebel et al. | | |
| 2008/0263752 | A1 | | 10/2008 | Solinsky et al. | | |
| 2010/0180364 | A1 | | 7/2010 | Willey et al. | | |
| 2010/0299814 | A1 | | 12/2010 | Celona et al. | | |
| 2011/0099695 | A1 | | 5/2011 | Siviter | | |
| 2011/0239354 | A1 | | 10/2011 | Celona et al. | | |
| 2012/0002046 | A1 | | 1/2012 | Rapoport et al. | | |

OTHER PUBLICATIONS

International Search Report for Corresponding International Patent Application No. PCT/US2014/020664, Issued Jun. 12, 2014.
International Search Report for Corresponding International Patent Application No. PCT/US2014/021192, Issued Jun. 12, 2014.
Non-Final Office Action, dated Feb. 26, 2015, corresponding to U.S. Appl. No. 13/798,757.

* cited by examiner

*Primary Examiner* — Phuong Dinh
(74) *Attorney, Agent, or Firm* — Ratnerprestia

(57) ABSTRACT

Systems for establishing electrical interconnections for helmet-mounted devices are disclosed. A system for establishing an electrical interconnection for a helmet-mounted device is comprises a first interconnect mechanism coupled to one of a helmet and the helmet-mounted device, and a second interconnect mechanism coupled to the other one of the helmet and the helmet-mounted device. The first interconnect mechanism comprises a first frame, a biasing member, a plurality of first electrical contacts, and a first projection. The second interconnect mechanism comprises a second frame, a plurality of second electrical contacts, and a second projection. As the first interconnect mechanism is moved toward the second interconnect mechanism, the contact between the first projection and the second projection causes rotation of the first frame in a direction opposite the predetermined rotational direction.

21 Claims, 4 Drawing Sheets

SYSTEMS FOR ESTABLISHING ELECTRICAL INTERCONNECTIONS FOR HELMET-MOUNTED DEVICES

FIELD OF THE INVENTION

The invention relates generally to helmet-mounted devices, and more particularly, to systems for establishing electrical interconnections for helmet-mounted devices.

BACKGROUND OF THE INVENTION

Conventionally, helmets for use in tactical or military operations may include one or more helmet-mounted devices, such as lights, cameras, or vision enhancement apparatuses. These devices are removably attached to the helmet, and may receive power to or electrical signals via their attachment to the helmet. In sensitive tactical or military operations, it is critical that helmet-mounted devices be firmly and reliably attached to the helmet. Additionally, it is important that these devices be attachable and removable from the helmet in a relatively simple manner. Accordingly, there exists a need for improvements in systems for attaching helmet-mounted devices to helmets.

SUMMARY OF THE INVENTION

Aspects of the present invention are directed to systems for establishing electrical interconnections for helmet-mounted devices.

In accordance with one aspect of the present invention, a system for establishing an electrical interconnection for a helmet-mounted device is disclosed. The system comprises a first interconnect mechanism coupled to one of a helmet and the helmet-mounted device, and a second interconnect mechanism coupled to the other one of the helmet and the helmet-mounted device. The first interconnect mechanism comprises a first frame, a biasing member, a plurality of first electrical contacts, and a first projection. The first frame is rotatable relative to the one of the helmet and the helmet-mounted device around an axis. The first frame defines an opening in an interior thereof. The biasing member is coupled to the first frame. The biasing member is configured to bias the first frame in a predetermined rotational direction around the axis. The plurality of first electrical contacts are positioned within the opening in the first frame. The first projection extends from the first frame. The second interconnect mechanism comprises a second frame, a plurality of second electrical contacts, and a second projection. The second frame is fixedly coupled to the other one of the helmet and the helmet-mounted device. The second frame defines an opening in an interior thereof. The plurality of second electrical contacts are positioned within the opening in the second frame. The second projection extends from the second frame and is positioned to contact the first projection. As the first interconnect mechanism is moved toward the second interconnect mechanism, the contact between the first projection and the second projection causes rotation of the first frame in a direction opposite the predetermined rotational direction.

In accordance with another aspect of the present invention, an interconnect mechanism for establishing an electrical interconnection for a helmet-mounted device is disclosed. The interconnect mechanism is adapted to be coupled to one of a helmet and the helmet-mounted device. The interconnect mechanism comprises a frame, a biasing member, a plurality of electrical contacts, and a projection. The frame is adapted to rotate relative to the one of the helmet and the helmet-mounted device around an axis. The frame defines an opening in an interior thereof. The biasing member is coupled to the frame. The biasing member is configured to bias the frame in a predetermined rotational direction around the axis. The plurality of electrical contacts are positioned within the opening in the frame. The projection extends from the frame.

In accordance with yet another aspect of the present invention, an interconnect mechanism for establishing an electrical interconnection for a helmet-mounted device is disclosed. The interconnect mechanism is adapted to be coupled to one of a helmet and the helmet-mounted device. The interconnect mechanism comprises a frame, a plurality of electrical contacts, and a projection. The frame is fixedly coupled to the one of the helmet and the helmet-mounted device. The frame defines an opening in an interior thereof. The plurality of electrical contacts are positioned within the opening in the frame. The projection extends from the frame.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. According to common practice, the various features of the drawings are not drawn to scale unless otherwise indicated. To the contrary, the dimensions of the various features may be expanded or reduced for clarity. Included in the drawings are the following figures.

DETAILED DESCRIPTION OF THE INVENTION

The embodiments of the invention described herein relate to mechanisms for mounting devices to helmets. The disclosed mechanisms provide for mechanically and electrically coupling helmet-mounted devices to helmets. Suitable devices for use with the present invention will be known to one of ordinary skill in the art from the description herein. These devices include, for example, lights, cameras, displays, or vision enhancement apparatuses (such as night vision devices).

Figure 1B:
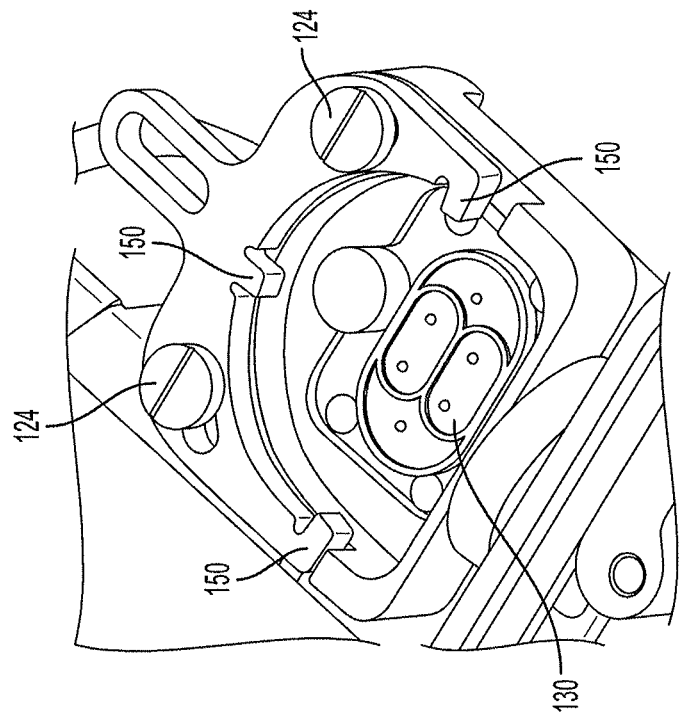
FIGS. 1A-1C are diagrams illustrating an exemplary system for establishing an electrical interconnection for a helmet-mounted device in accordance with aspects of the present invention.
Figure 1A:
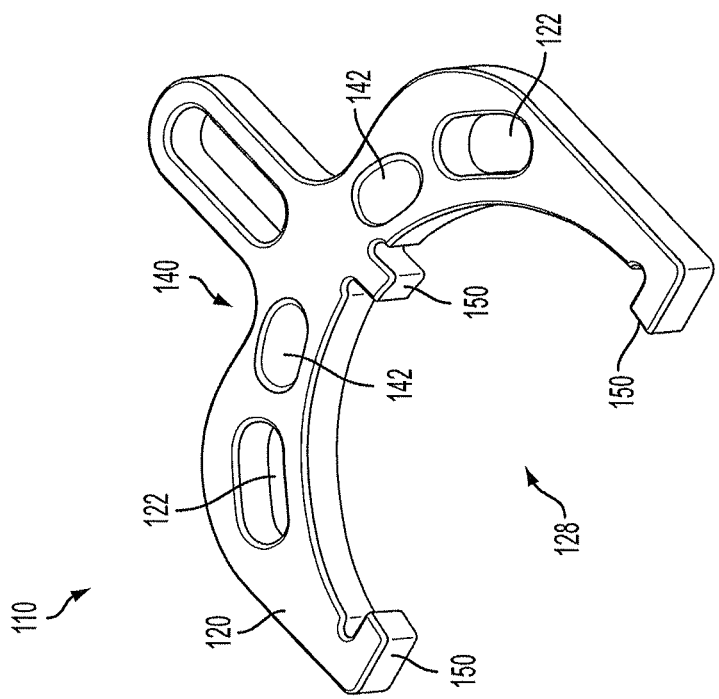
Figure 1C:
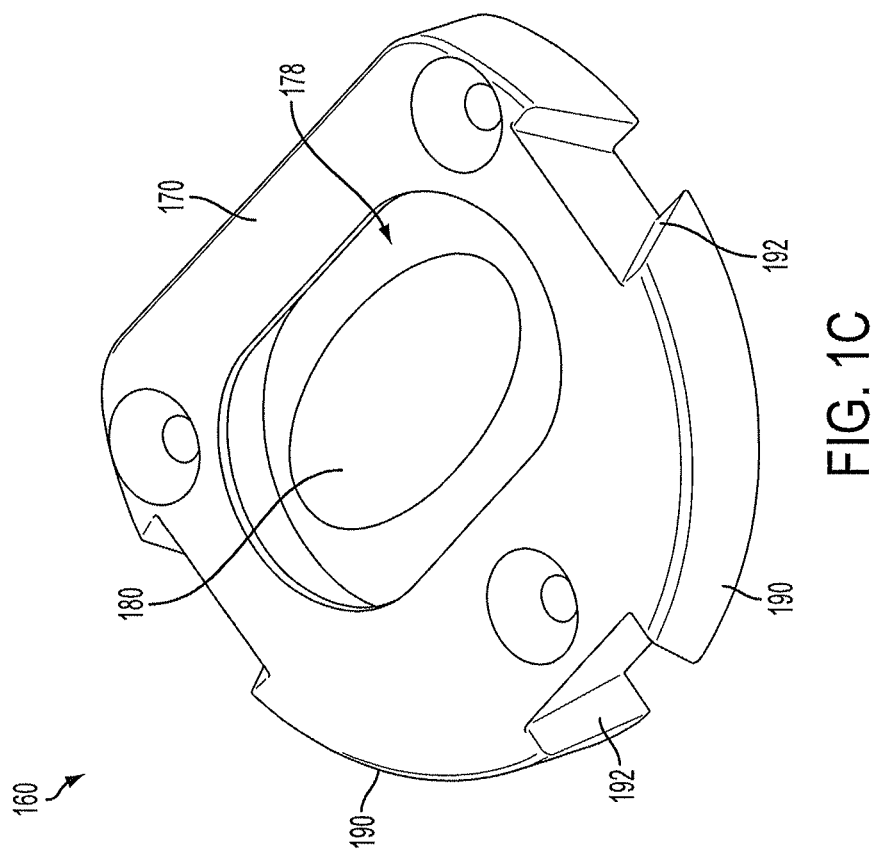

Referring now to the drawings, FIGS. 1A-1C illustrate an exemplary system 100 for establishing an electrical interconnection for a helmet-mounted device in accordance with aspects of the present invention. System 100 may be usable for mounting a night-vision to a helmet. As a general overview, system 100 includes a first interconnect mechanism 110 and a second interconnect mechanism 160. Additional details of system 100 are described herein.

As shown in FIG. 1A, first interconnect mechanism 110 generally includes a frame 120, a plurality of electrical contacts 130, a biasing member 140, and a projection 150. While first interconnect mechanism 110 is described herein as being attached to a helmet, it will be understood to one of ordinary skill in the art that first interconnect mechanism 110 may be coupled to either one of the helmet or the helmet-mounted device.

Frame 120 is rotatable relative to the helmet around an axis. In an exemplary embodiment, frame 120 includes one or more slots 122. First interconnect mechanism 110 includes corresponding pins 124 projecting through respective ones of slots 122, as shown in FIG. 1B. Pins 124 may be fixed directly to the helmet, or may be fixed to a component of first interconnect mechanism 110 that is fixed directly to the helmet (e.g., an interface plate). As shown in FIG. 1A, slots 122 are shaped to guide rotation of frame 120 relative to the helmet around the axis. Rotation of frame 120 moves pins 124 along the length of slots 122. The length of slots 122 may be selected based on the desired extent of rotation of frame 120.

Frame 120 defines an opening 128 in an interior thereof. In an exemplary embodiment, frame 120 is a substantially U-shaped frame. In this embodiment, the opening 128 is defined between opposed arms of the U-shaped frame. Suitable materials for forming frame 120 will be known to one of ordinary skill in the art from the description herein.

The plurality of electrical contacts 130 are positioned within the opening 128 in frame 120, as shown in FIG. 1B. Electrical contacts 130 may be fixed directly to the helmet, or may be fixed to a component of first interconnect mechanism 110 that is fixed directly to the helmet (e.g., the interface plate). Electrical contacts 130 may be usable for power connections, signal connections, or any other electrical connections from the helmet. Suitable connections to be implemented by electrical contacts 130 will be known to one of ordinary skill in the art from the description herein.

Figure 2B:
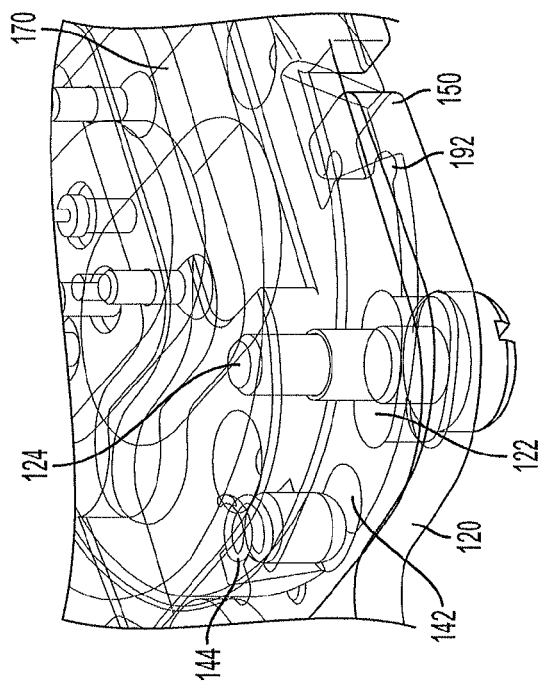
FIGS. 2A-2C are diagrams illustrating an exemplary operation of the system of FIGS. 1A-1C.
Figure 2A:
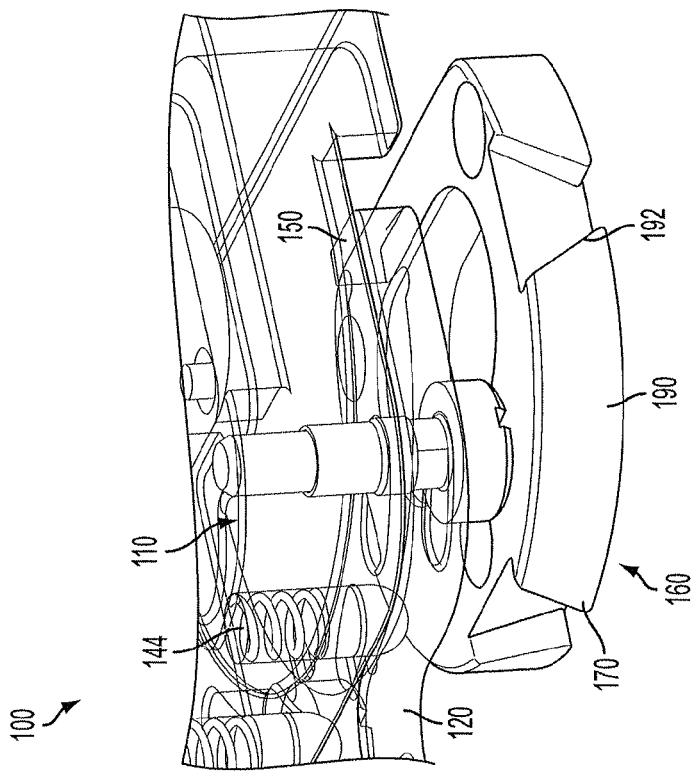
Figure 2C:
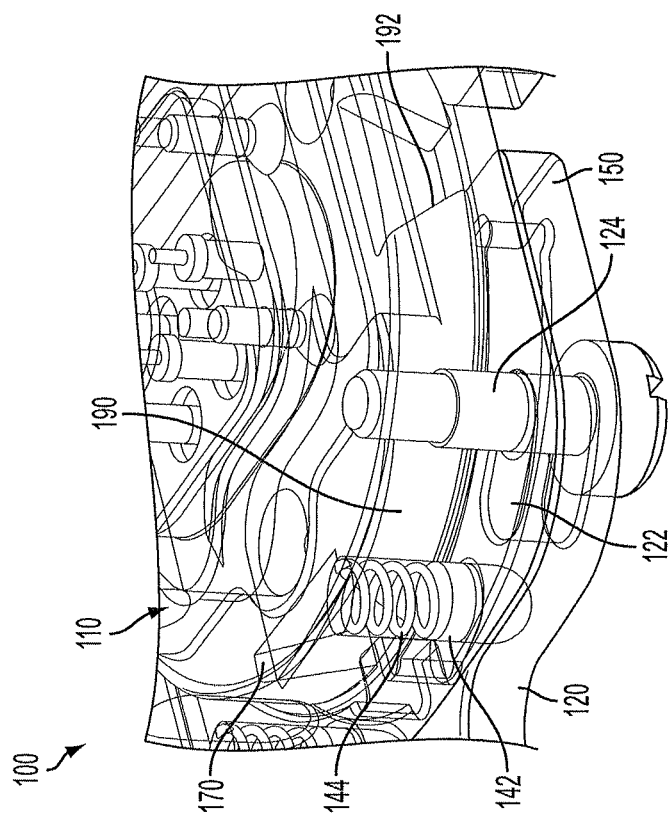

Biasing member 140 is coupled to frame 120. Biasing member 140 is configured to bias frame 120 in a predetermined rotational direction around the axis. In an exemplary embodiment, biasing member 140 comprises one or more ramped surfaces 142 formed on frame 120, as shown in FIG. 1A. First interconnect mechanism 110 includes corresponding spring detents 144 contacting respective ones of ramped surfaces 142, as shown in FIGS. 2A-2C. Detents 144 may comprise projections affixed to one end of conventional springs, with the other end of the springs fixed to either the helmet or to a component of first interconnect mechanism 110 that is fixed directly to the helmet. Ramped surfaces 142 are shaped to provide the bias to frame 120. For example, ramped surfaces 142 may be shaped such that one end of each surface is relatively raised (thus causing compression of the spring detent 144) and another end of each surface is relatively lowered (thus allowing extension of spring detent 144). With this structure, the interaction of spring detects 144 with ramped surfaces 142 biases frame 120 in a predetermined rotational direction (i.e. from the raised end of each ramped surface 142 to the lowered end).

It will be understood by one of ordinary skill in the art that biasing member 140 is not limited to the above-identified embodiment. For example, biasing member 140 may comprise a conventional torsion spring configured to bias frame 120 in a predetermined rotational direction. Other suitable biasing members 140 will be known to one of ordinary skill in the art from the description herein.

Projection 150 extends from frame 120. As shown in FIG. 1A, projection 150 projects radially inwardly from one of the opposed arms of the U-shaped frame. Projection 150 may comprise a narrow prong extending from the inner surface of frame 120. However, projection 150 may have any structure suitable for performing the coupling operation described herein. While only one projection 150 is discussed herein, it will be understood that first interconnect mechanism 110 may have multiple projections, as shown in FIG. 1A. As will be discussed in greater detail herein, projection 150 is positioned to contact a mating projection on second interconnect mechanism 160.

First interconnect mechanism 110 is not limited to the above described components, but may include alternative or additional components, as would be understood by one of ordinary skill in the art.

For example, first interconnect mechanism 110 may include a protruding portion 155. As shown in FIG. 1A, protruding portion 155 protrudes radially outwardly from frame 120. Protruding portion 155 enables a user of system 100 to manually rotate frame 120 around the axis. For example, protruding portion 155 may enable a user to rotate frame 120 against biasing member 140 (e.g., to unlock first interconnect mechanism 110, as discussed below).

As shown in FIG. 1C, second interconnect mechanism 160 generally includes a frame 170, a plurality of electrical contacts 180, and a projection 190. While second interconnect mechanism 160 is described herein as being attached to a helmet-mounted device, it will be understood to one of ordinary skill in the art that first interconnect mechanism 160 may be coupled to either one of the helmet or the helmet-mounted device.

Frame 170 is fixedly coupled to the helmet-mounted device. Frame 170 defines an opening 178 in an interior thereof. In an exemplary embodiment, frame 170 is a substantially O-shaped frame. In this embodiment, the opening 178 is defined within the interior of the O-shaped frame. Suitable materials for forming frame 170 will be known to one of ordinary skill in the art from the description herein.

The plurality of electrical contacts 180 are positioned within the opening 178 in frame 170, as shown in FIG. 1C. Electrical contacts 180 may be usable for power connections, signal connections, or any other electrical connections for the helmet-mounted device. Suitable connections to be implemented by electrical contacts 180 will be known to one of ordinary skill in the art from the description herein.

Projection 190 extends from frame 170. As shown in FIG. 1C, projection 190 projects radially outwardly from frame 190. Projection 190 may comprise a broad ledge extending from the outer surface of frame 170. However, projection 190 may have any structure suitable for performing the coupling operation described herein, like projection 150. As with projection 150, while only one projection 190 is discussed herein, it will be understood that second interconnect mechanism 160 may have any number of projections 190 corresponding to the number of projections 150, as shown in FIG. 1C.

Projection 190 comprises an inclined surface 192. As will be discussed in greater detail herein, projection 190 is positioned to contact projection 150 of first interconnect mechanism 110. Upon contact, inclined surface 192 forces projection 150 in a predetermined rotational direction, thus resulting in rotation of frame 120. While inclined surface 192 is illustrated as being formed on projection 190, it will be understood by one of ordinary skill in the art that an inclined surface could instead be formed on projection 150, or that both projections 150 and 190 could have opposing inclined surfaces.

An exemplary operation of system 100 will now be described in accordance with aspects of the present invention. It will be understood by one of ordinary skill in the art that the following operation is in no way limiting of the scope of the present invention, but is provided to illustrate the operation of the exemplary embodiment described herein.

In order to mate the helmet-mounted device to the helmet, second interconnect mechanism 160 is moved in the direction of first interconnect mechanism 110 along the axis around which first interconnect mechanism 110 rotates, as shown in FIG. 2A. As first interconnect mechanism 110 moves toward second interconnect mechanism 160, projection 150 makes contact with projection 190. This contact between projection 150 and projection 190 causes projection 150 to slide along inclined surface 192, resulting in rotation of frame 120 around the axis in a direction opposite the direction biased by biasing member 140 (i.e., frame 120 rotates against the force of biasing member 140) This is shown in FIG. 2B.

As first interconnect mechanism 110 continues to move toward second interconnect mechanism 160, it reaches a predetermined limit where projection 150 passes beyond a rear edge of projection 190. At this point, the contact between projection 150 and inclined surface 192 of projection 190 terminates. This also terminates the force opposing biasing member 140, and as a result, biasing member 140 rotates frame 120 in the predetermined rotational direction. This results in projection 150 being positioned behind projection 190, as shown in FIG. 2C.

When projection 150 is positioned behind projection 190, electrical contacts 130 of first interconnect mechanism 110 make contact with respective ones of electrical contacts 180 of second interconnect mechanism 180. This completes the electrical interconnection of the helmet-mounted device to the helmet.

The above-described mating of first interconnect mechanism 110 and second interconnect mechanism 160 provides for improved mechanical and electrical interconnection between the helmet-mounted device and the helmet. In particular, when projection 150 is positioned behind projection 190, projection 150 presses frame 170 against the helmet (or against an interface plate fixed to the helmet). Because electrical contacts 130 and 180 are located within openings in frames 120 and 170, this compression provides an environmental seal for protecting contacts 130 and 180. In other words, frame 170 acts a barrier between electrical contacts 130 and 180 and the environment surrounding first and second interconnect mechanisms 110 and 160. This may be desirable when helmet-mounted device is used in adverse (e.g. wet) conditions. Additionally, when projection 150 is positioned behind projection 190, frame 170 is prevented from movement relative to the helmet. This provides a firm mechanical connection between the helmet-mounted device and the helmet.

To unmate first interconnect mechanism 110 from second interconnect mechanism 160, a user rotates frame 120 against the biasing force from biasing member 140 using protruding portion 155. Frame 120 is rotated until projection 150 is no longer positioned behind projection 190. When projection 150 is no longer positioned behind projection 190, second interconnect mechanism 160 may be moved away from first interconnect mechanism 110.

In another exemplary operation, protruding portion 155 may be used to effect mating of first and second interconnect mechanisms 110 and 160. For example, rather than rotation of frame 120 being caused by contact of projection 150 with inclined surface 192 of projection 190, the user may pre-rotate frame 120 using protruding portion 155. After rotating frame 120 to a sufficient degree, first interconnect mechanism 110 may then be moved toward second interconnect mechanism 160, and protruding portion 155 may be released, allow biasing member 140 to rotate frame 120 in the predetermined rotational direction. This results in projection 150 being positioned behind projection 190 without the above-described contact of projection 150 with projection 190—in effect, a manual mating operation instead of the automatic one described above.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for establishing an electrical interconnection for a helmet-mounted device comprising:
   a first interconnect mechanism coupled to one of a helmet and the helmet-mounted device, the first interconnect mechanism comprising:
      a first frame rotatable relative to the one of the helmet and the helmet-mounted device around an axis, the first frame defining an opening in an interior thereof;
      a biasing member coupled to the first frame, the biasing member configured to bias the first frame in a predetermined rotational direction around the axis;
      a plurality of first electrical contacts positioned within the opening in the first frame; and
      a first projection extending from the first frame; and
   a second interconnect mechanism coupled to the other one of the helmet and the helmet-mounted device, the second interconnect mechanism comprising:
      a second frame fixedly coupled to the other one of the helmet and the helmet-mounted device, the second frame defining an opening in an interior thereof;
      a plurality of second electrical contacts positioned within the opening in the second frame; and
      a second projection extending from the second frame and positioned to contact the first projection,
   wherein as the first interconnect mechanism is moved toward the second interconnect mechanism, a contact between the first projection and the second projection causes rotation of the first frame in a direction opposite the predetermined rotational direction.

2. The system of claim 1, wherein as the first interconnect mechanism is moved toward the second interconnect mechanism beyond a predetermined limit, the contact between the first projection and the second projection terminates, and the biasing member rotates the first frame in the predetermined rotational direction such that the first projection is positioned behind the second projection.

3. The system of claim 2, wherein when the first projection is positioned behind the second projection, the plurality of first electrical contacts make contact with respective ones of the plurality of second electrical contacts.

4. The system of claim 2, wherein when the first projection is positioned behind the second projection, the first projection presses the second frame against the one of the helmet and the helmet-mounted device.

5. The system of claim 2, wherein when the first projection is positioned behind the second projection, the second frame is prevented from movement relative to the one of the helmet and the helmet-mounted device.

6. The system of claim 1, wherein the first frame comprises a substantially U-shaped frame, with the opening in the first frame defined between opposed arms of the U-shaped frame.

7. The system of claim 6, wherein the first projection projects radially inwardly from one of the opposed arms of the U-shaped frame.

8. The system of claim 1, wherein the first frame comprises one or more slots, wherein the first interconnect mechanism further comprises one or more pins projecting through respective ones of the one or more slots, in order to guide rotation of the first frame relative to the one of the helmet and the helmet-mounted device around the axis.

9. The system of claim 1, wherein the biasing member comprises one or more ramped surfaces formed on the first frame,
wherein the first interconnect mechanism further comprises one or more spring detents in contact with respective ones of the one or more ramped surfaces, in order to bias the first frame in the predetermined rotation direction around the axis.

10. The system of claim 1, further comprising a protruding portion extending radially outwardly from the first frame, the protruding portion enabling a user to manually rotate the first frame around the axis.

11. The system of claim 1, wherein the second frame comprises a substantially O-shaped frame, with the opening in the second frame defined within an interior of the O-shape.

12. The system of claim 1, wherein the second projections projects radially outwardly from the second frame.

13. An interconnect mechanism for establishing an electrical interconnection for a helmet-mounted device, the interconnect mechanism adapted to be coupled to one of a helmet and the helmet-mounted device, the interconnect mechanism comprising:
 a frame adapted to rotate relative to the one of the helmet and the helmet-mounted device around an axis, the frame defining an opening in an interior thereof;
 a biasing member coupled to the frame, the biasing member configured to bias the frame in a predetermined rotational direction around the axis;
 a plurality of electrical contacts positioned within the opening in the frame; and
 a projection extending from the frame.

14. The mechanism of claim 13, wherein the frame comprises a substantially U-shaped frame, with the opening in the frame defined between opposed arms of the substantially U-shaped frame.

15. The mechanism of claim 14, wherein the projection projects radially inwardly from one of the opposed arms of the substantially U-shaped frame.

16. The mechanism of claim 13, wherein the frame comprises one or more slots,
wherein the interconnect mechanism further comprises one or more pins projecting through respective ones of the one or more slots, in order to guide rotation of the frame relative to the one of the helmet and the helmet-mounted device around the axis.

17. The system of claim 1, wherein the biasing member comprises one or more ramped surfaces formed on the frame,
wherein the interconnect mechanism further comprises one or more spring detents in contact with respective ones of the one or more ramped surfaces, in order to bias the frame in the predetermined rotation direction around the axis.

18. The mechanism of claim 13, further comprising a protruding portion extending radially outwardly from the frame, the protruding portion enabling a user to manually rotate the frame around the axis.

19. An interconnect mechanism for establishing an electrical interconnection for a helmet-mounted device, the interconnect mechanism adapted to be coupled to one of a helmet and the helmet-mounted device, the interconnect mechanism comprising:
 a frame fixedly coupled to the one of the helmet and the helmet-mounted device, the frame defining an opening in an interior thereof;
 a plurality of electrical contacts positioned within the opening in the frame; and
 a projection extending from the frame.

20. The mechanism of claim 19, wherein the frame comprises a substantially O-shaped frame, with the opening in the frame defined within an interior of the substantially O-shaped frame.

21. The mechanism of claim 19, wherein the projection projects radially outwardly from the frame.

* * * * *